June 22, 1937. W. SOPHER 2,084,923
ROTARY INTERNAL COMBUSTION ENGINE
Filed Nov. 26, 1930 2 Sheets-Sheet 2
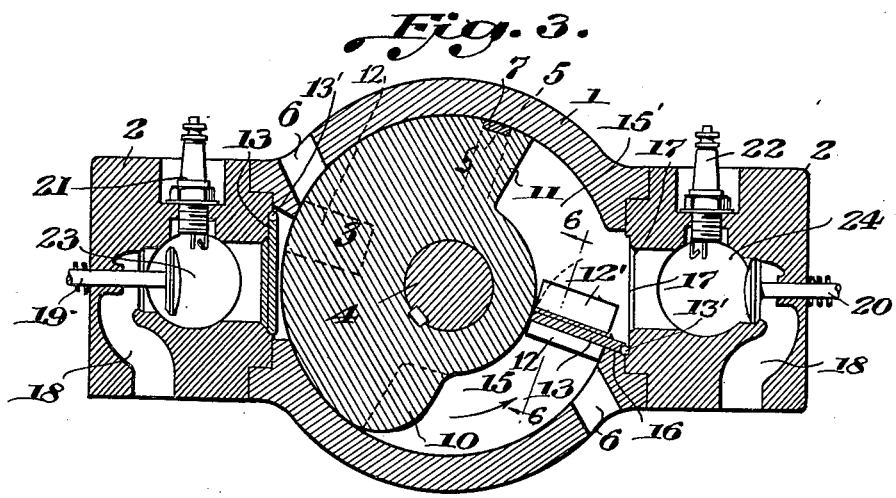
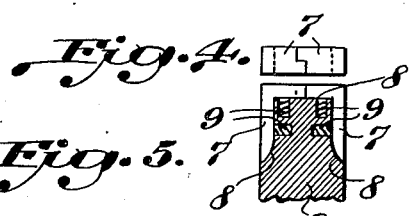
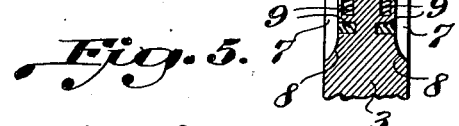
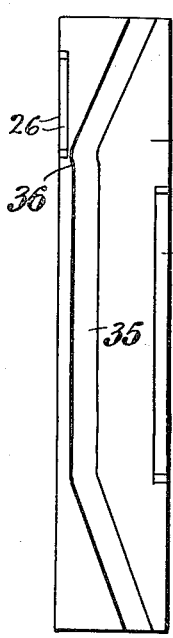
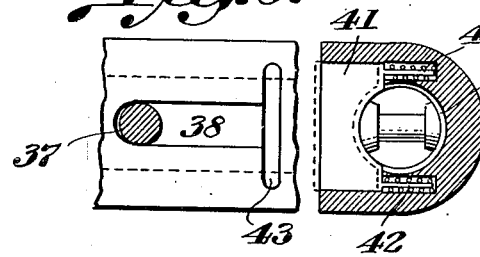
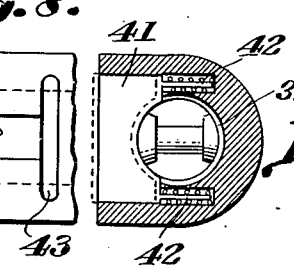
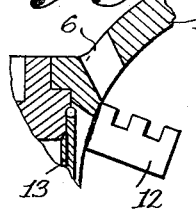
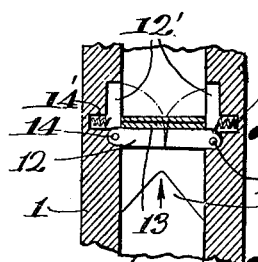
Inventor;
Walter Sopher
By [signature] Atty.

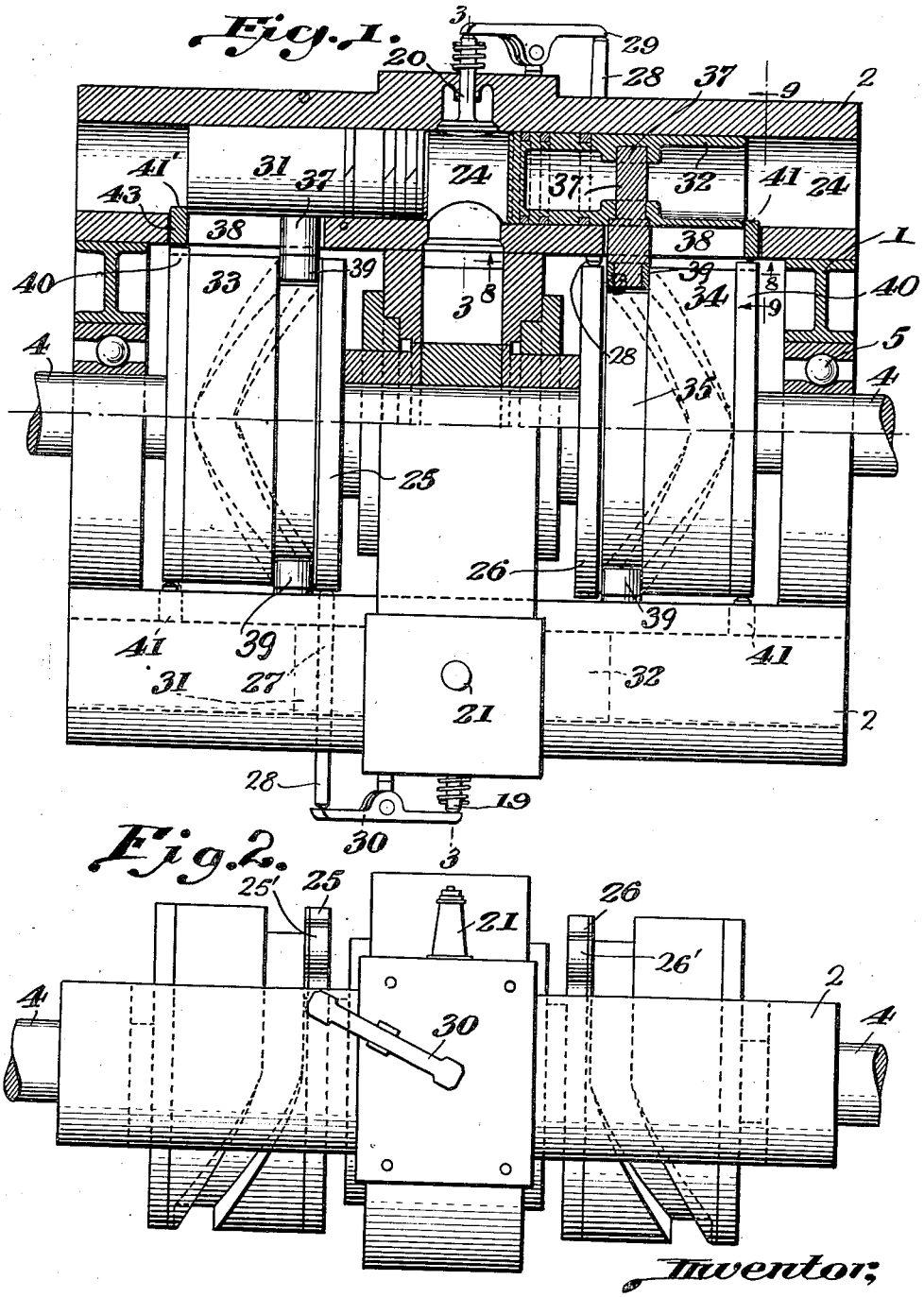

Patented June 22, 1937

2,084,923

UNITED STATES PATENT OFFICE 2,084,923

ROTARY INTERNAL COMBUSTION ENGINE

Walter Sopher, Grand Island, Nebr.

Application November 26, 1930, Serial No. 498,470

8 Claims. (Cl. 123—15)

This invention relates to rotary internal combustion engines and has for its objects, among others, first to provide a rotor, a plurality of sets of charge-compressing pistons, and novel means for operating said pistons in coordination with the rotor, to the end that one set of pistons will be compressing the charge for use by the rotor while the charge previously compressed by another set of pistons is being used expansively to propel the rotor; second, to make auxiliary provision for locking the pistons to prevent them from being driven backwardly when the charge is fired, said means being coordinated with the rotor; third, to provide novel means for positively operating the sets of pistons by the rotor; fourth, to make provision for operating the inlet valves by the rotor in timed relationship thereto so that the valves will operate in alternation; fifth, to provide novel valves cooperating with the rotor which serve as abutments and cut-offs that permit the charge to be used expansively against the rotor, without interfering with the revolutions of said rotor and to permit the exploded or fired charge to be scavenged from the rotor cylinder; sixth, to provide improved packing means for the rotor; seventh, to combine the rotor, pistons, inlet valves, and operating means in a novel manner; eighth, to provide other improvements whose construction and operation will appear more fully hereinafter.

In the accompanying drawings:

Figure 1 is a part plan, part sectional, view of the engine;

Fig. 2 is a view at right angles to Fig. 1, certain parts being omitted;

Fig. 3 is a section on the line 3—3, Fig. 1;

Fig. 4 is a detail plan view of the packing for the rotor;

Fig. 5 is a detail section of the rotor, taken approximately on the line 5—5, Fig. 3, but showing the packing in elevation;

Fig. 6 is a detail fragmentary section through the rotor casing, taken on the line 6—6, Fig. 3, showing the duplex shutter and gate valves;

Fig. 7 is a fragmentary detail sectional view showing one of the shutter valves;

Fig. 8 is a fragmentary sectional view on the line 8—8, Fig. 1, partly in elevation and with parts removed;

Fig. 9 is a detail section on the line 9—9, Fig. 1, showing one of the pistons and its lock; and Fig. 10 is a diagrammatic view of one of the cam structures.

The present rotary internal combustion engine has no crank shaft, connecting rods or exhaust valve and comprises but few parts, is adapted to operate quietly, develop considerably more expansion than internal combustion engines known to the art, is of very light weight per horsepower, of low speed, and consumes a relatively small amount of fuel while producing very high mileage per gallon of fuel when used in connection with an automobile.

No disclosure is given of a special base or mounting for the engine, as any support therefor may be used.

The engine block comprises a rotor shell or casing 1, and duplicate heads 2, 2, therefor, which are connected to the shell or casing 1 in any desired manner, no disclosure being given of the connection.

The rotor 3, which is adapted to revolve in the shell or casing 1, is carried by a shaft 4 mounted in suitable ball bearings 5, connected to the shell 1.

The exhaust ports appear at 6, being without valves, as such valves are unnecessary. Any exhaust pipe or manifold may be connected to the exhaust ports 6.

The rotor 3 has an improved sectional packing comprising L-shaped sections 7, 7 which are received in channels 8 extending across the periphery and down the sides of the rotor. The sections 7, 7 are seated on expansion coil springs 9, 9 which are located in suitable pockets in the rotor. This packing packs the sides and the periphery of the rotor and prevents the escape of the expanded mixture or charge. While only one such packing is shown, others may be provided. The rotor turns in the direction indicated by the arrow in Fig. 3.

The rotor is provided with a pointed or beveled part 10, which is located substantially diametrically opposite the piston face 11 of the rotor, it being understood that it is the expansive action of the exploded charge which acts against the piston face 11 to turn the rotor in the direction indicated by the arrow.

Valves are arranged on each side of the rotor shell or casing 1, as shown in Figs. 3, 6, and 7, to constitute a duplex abutment against which the exploded charge reacts so that the expansive action of said charge on the piston face 11 will revolve the rotor 3.

The duplex abutment comprises a pair of shutter valves 12 hinged at 14 to the rotor shell 1 at opposite sides of piston chamber 15, in position to swing across said chamber as shown in Fig. 6. Springs 14' normally tend to push the shutter valves 12 inwardly to the positions shown in Fig. 6, until said valves 12 are engaged by the beveled part 10 of the rotor and pressed back into recesses 12' in the walls of chamber 15, as shown in Fig. 7.

Just ahead of the pair of shutter valves 12 is a gate valve 13 hinged at one end 13' in position to engage a seat 17, as shown at the left of Fig. 3, or to swing inwardly against a shoulder 16, as shown at the right of Fig. 3, in which latter position the gate valve 13 and the shutter valves 12 therebehind form a duplex abutment against which the fired charge reacts while said charge is expanding in chamber 15' and acting against piston face 11 of the rotor 3. In this position, the shutter valves 12 underlie the edges of the gate valve 13 and cooperate therewith in preventing the escape of the fixed charge through the adjacent exhaust port 6.

The force of the explosion acts on the piston face 11 of the rotor 3 to move the rotor in the direction of the arrow in Fig. 3, which movement causes the beveled part 10 of the rotor to strike the inner edges of the shutter valves 12 which moves the gate valve 13 against its seat 17 and flattens out the shutter valves 12 in the recesses 12', the round part of said rotor holding the valves 12 and 13 closed until the valves are released by the passing of the piston face 11.

No carburetor is shown, it being understood that any desired carburetor may be used and any source of gasoline supply utilized to deliver the charge to the inlet ports 18. The spring-closed inlet valves appear at 19, 20, and, as shown, the inlet valve 19 is open as the charge on the left hand side, Fig. 3, is not yet being compressed, whereas the inlet valve 20 is shown as closed, as the charge at the right hand side, Fig. 3, has been exploded and is being used expansively to drive the rotor 3.

Spark plugs 21, 22, are used to explode the charges, under control by any suitable ignition means and timing, not shown.

The compression chambers appear at 23, 24, the charge being alternately compressed and exploded in the respective chambers.

The rotor shaft 4 carries cams 25, 26, having high points 25', 26', which respectively operate the valve rods 27, 28, co-operating with the rockers 30, 29, which, in turn, operate the stems of the valves 19, 20, the timing being such that when one of the valves is closed, the other will be opened, as will be readily understood. Any suitable spring means may be used for seating the valves 19, 20, in opposition to the opening tendency of the push rods 27, 28.

Flanking the rotor and located in the heads 2, 2, are the compression chambers, 23, 24, previously referred to. Suitably packed, opposing charge-compressing pistons 31, 32, are located in the respective compression chambers 23, 24. When one pair of these pistons is in the position shown at the top of Fig. 1, the charge then being fully compressed, the spark plug 22, say, will be fired to explode the compressed charge, which will then pass into the chamber 15' and act against the piston face 11 while reacting against the valves 12, 13, turning the rotor 3. At that time, the other pair of pistons 31, 32, will be compressing the charge in the other compression chamber 23. The pistons 31, 32, which have previously compressed the charge that has been fired, will then retreat to admit another charge for a subsequent compression, as will be well understood.

To effect this action of the sets of pistons, said pistons are co-ordinated with the shaft 4 and the rotor 3 by the following means.

Secured to the shaft 4 are cams 33, 34, one of which is shown diagrammatically in Fig. 10. Each of these cams has a cam groove 35 therein of proper contour, with suitable risers and dwells and is provided with an offset part 36. The pistons 31, 32 carry the pins 37, Fig. 1, which project through slots 38 in the shell 1 and have rollers 39 thereon which are received in the cam grooves or slots 35, whereby the timing of the sets of pistons 31, 32, as previously described, is effected.

Secured to the shaft 4 and formed as parts of the cams 33, 34, are high points 40, which cooperate with the special locks 41, shown in Figs. 1, 8 and 9. The locks 41 are acted on by springs 42. The slot in which the lock 41 moves, is shown at 43, Fig. 8. In Fig. 9, dotted lines represent the normal position of the lock 41, and full lines the position thereof when the high point 40 pushes the lock 41 into the position shown in Fig. 1 for locking its piston.

The operation will be apparent from the foregoing description, but a short description thereof will be given. The charge is admitted to the compression chamber 23 or 24 by the valve 19 or 20, at which time the corresponding gate valve is closed against its seat 17 where it is held by the rotor. The charge-compressing pistons 31 and 32 are moved toward each other by the cam grooves 35 in the cams 33 and 34 to compress the charge held in the compression chamber. Immediately after the piston face 11 of the rotor 3 passes the shutter valves 12 and gate valve 13, the valves 12 are forced inward across the piston chamber, and the gate valve 13 is free to swing open against the shutter valves. The explosion occurs in proper timed relation to the movement of the rotor and acts against the piston face 11 thereof to turn the rotor, which movement causes the beveled part 10 of the rotor to strike the inner edges of the shutter valves 12 which move the gate valve 13 against its seat 17 and flattens out the shutter valves 12 in the recesses 12', the round part of the rotor holding the valves 12 and 13 closed until the valves are released by the passing of the piston face 11. As the piston face 11 passes the valves on opposite sides of the cylinder, the explosions occur alternately, first on one side of the engine and then on the other, in properly timed relation.

I claim:

1. In a rotary internal combustion engine, the combination with a rotor and the cylinder in which it is adapted to revolve, of a port having a valve seat for admitting the fired charge to the cylinder for action on said rotor, a swinging abutment valve movable into the cylinder to admit the charge thereto and also adapted to close said valve seat, a second swinging abutment valve adapted to bridge the space between the cylinder and the rotor, and means on the rotor adapted, during the rotation of said rotor, first to engage and swing the second swinging abutment valve and then to engage and close the first-named abutment valve.

2. In a rotary internal combustion engine, the combination with a rotor and the cylinder in which it is adapted to revolve, of a port having a valve seat for admitting the fired charge to the cylinder for action on said rotor, a valve adapted to seat on said valve seat to control the admission of the charge to the cylinder, a two-part shutter valve each of whose parts is freely hingedly mounted for bodily swinging, said sections being adapted jointly to constitute a cross-abutment in the cylinder, and means on the rotor adapted to engage said two-part valve and, by contact alone, to spread it and close it against its valve seat, said shutter valve being automatically self-restoring when the rotor disengages therefrom.

3. In a rotary internal combustion engine, the combination with a rotor and the cylinder in which it is adapted to revolve, said rotor having a double-beveled part which turns in the cylinder, of a port having a valve seat for admitting the fired charge to the cylinder for action on said rotor, a valve adapted to seat on said valve seat to control the admission of the charge to the cylinder, and a two-part shutter valve whose sections are, respectively, freely hingedly mounted opposite to each other at the side walls of the cylinder and are adapted to swing across the cylinder to jointly constitute a cross-abutment therein, against which the fired charge may react when acting on the rotor, means being provided to normally automatically position and to maintain the sections of said valve crosswise of the cylinder, the double-beveled part on the rotor being adapted to engage both parts of the valve and, by contact alone, close them against the cylinder walls, said shutter valve being automatically self-restoring to the aforesaid normal position when the rotor disengages therefrom.

4. In a rotary internal combustion engine, the combination with a rotor and the cylinder in which it is adapted to revolve, said rotor having a double-beveled part which turns in the cylinder, of a port having a valve seat for admitting the fired charge to the cylinder for action on said rotor, a two-part shutter valve whose sections are, respectively, freely hingedly mounted opposite to each other at the side walls of the cylinder and are adapted to swing across the cylinder to jointly constitute a cross-abutment therein, against which the fired charge may react when acting on the rotor, means being provided to normally automatically position and to maintain the sections of said valve crosswise of the cylinder, the double-beveled part on the rotor being adapted to engage both parts of the valve and, by contact alone, close them against the cylinder walls, said shutter valve being automatically self-restoring to the aforesaid normal position when the rotor disengages therefrom, and a swinging charge-admitting valve, mounted to swing independently of the aforesaid two-part shutter valve, which is movable into the cylinder to admit the charge thereto and is adapted to be engaged by the double-beveled part on the rotor for the purpose of closing said charge-admitting valve against the valve seat after the double-beveled part has engaged and spread the two-part shutter valve.

5. In a rotary internal combustion engine, the combination with a stator having a cylinder, of a rotor in said cylinder, a combustion chamber, firing means therefor, a port in the stator having a valve seat for admitting the fired charge to the cylinder for action on said rotor, a swinging abutment valve movable into the cylinder to admit the fired charge thereto and also adapted to close said valve seat, a second swinging abutment valve adapted to bridge the space between the cylinder and the rotor, and means on the rotor adapted, during the rotation of said rotor, first to directly strike and swing the second swinging abutment valve and then to directly strike and close the first-named abutment valve.

6. In a rotary internal combustion engine, the combination with a stator having a cylinder, of a rotor in said cylinder, a combustion chamber, firing means therefor, a port in the stator having a valve seat for admitting the fired charge to the cylinder for action on said rotor, a valve adapted to seat on said valve seat to control the admission of the charge to the cylinder, a two-part shutter valve each of whose parts has spring means by which it is automatically closed, said parts being hingedly mounted for free bodily swinging independently of the other part thereof, said parts of the shutter valve when not engaged by the rotor being adapted jointly to constitute a cross-abutment in the cylinder, and means on the rotor adapted to directly strike both parts of said two-part valve and, by contact alone, to spread it and press it against its valve seat, said shutter valve being automatically self-restoring when the rotor disengages therefrom.

7. In a rotary internal combustion engine, the combination with a stator having a cylinder, of a rotor in said cylinder having a double-bevelled part which turns in said cylinder, a port having a valve seat for admitting the fired charge to the cylinder for action on said rotor, a valve adapted to seat on said valve seat to control the admission of the charge to the cylinder, and a two-part shutter-valve having independent parts which have springs means by which they are closed crosswise of the cylinder, each of said parts being hingedly mounted opposite to each other at the side walls of the cylinder independently of the other part thereof, said parts being adapted to swing across the cylinder to jointly constitute a cross-abutment therein against which the fired charge may react when acting on the rotor, the double-bevelled part on the rotor being adapted to directly strike both parts of the valve and, by contact alone, open them and hold them against the cylinder walls during the time the rotor is engaged with them, the aforesaid spring means for automatically operating the parts of the shutter-valve causing said shutter-valve parts to automatically assume normal position crosswise of the cylinder when the rotor disengages therefrom.

8. In a rotary internal combustion engine, the combination with a stator having a cylinder, of a rotor in said cylinder having a double-bevelled part which turns in said cylinder, a port having a valve seat for admitting the fired charge to the cylinder for action on said rotor, a two-part shutter-valve having independent parts which have spring means by which they are closed crosswise of the cylinder, each of said parts being hingedly mounted opposite to each other at the side walls of the cylinder independently of the other part thereof, said parts being adapted to swing across the cylinder to jointly constitute a cross abutment therein, against which the fired charge may react when acting on the rotor, the double-bevelled part on the rotor being adapted to directly strike both parts of the valve and, by contact alone, open them and hold them against the cylinder walls during the time the rotor is engaged with them, the aforesaid spring means for automatically operating the parts of the shutter-valve causing said shutter-valve parts to automatically assume normal position cross-wise of the cylinder when the rotor disengages therefrom, and a swinging charge-admitting valve mounted to swing independently of the aforesaid two-part shutter-valve and to move into the cylinder to admit the charge thereto and being adapted to be directly struck by the double-bevelled part on the rotor for the purpose of closing said charge-admitting valve against the valve seat after the double-bevelled part has engaged and spread the two-part shutter-valve.

WALTER SOPHER.